No. 641,403.  
J. P. OUTCALT.  
CORN SHELLER.  
(Application filed Nov. 2, 1899.)  
Patented Jan. 16, 1900.
(No Model.)
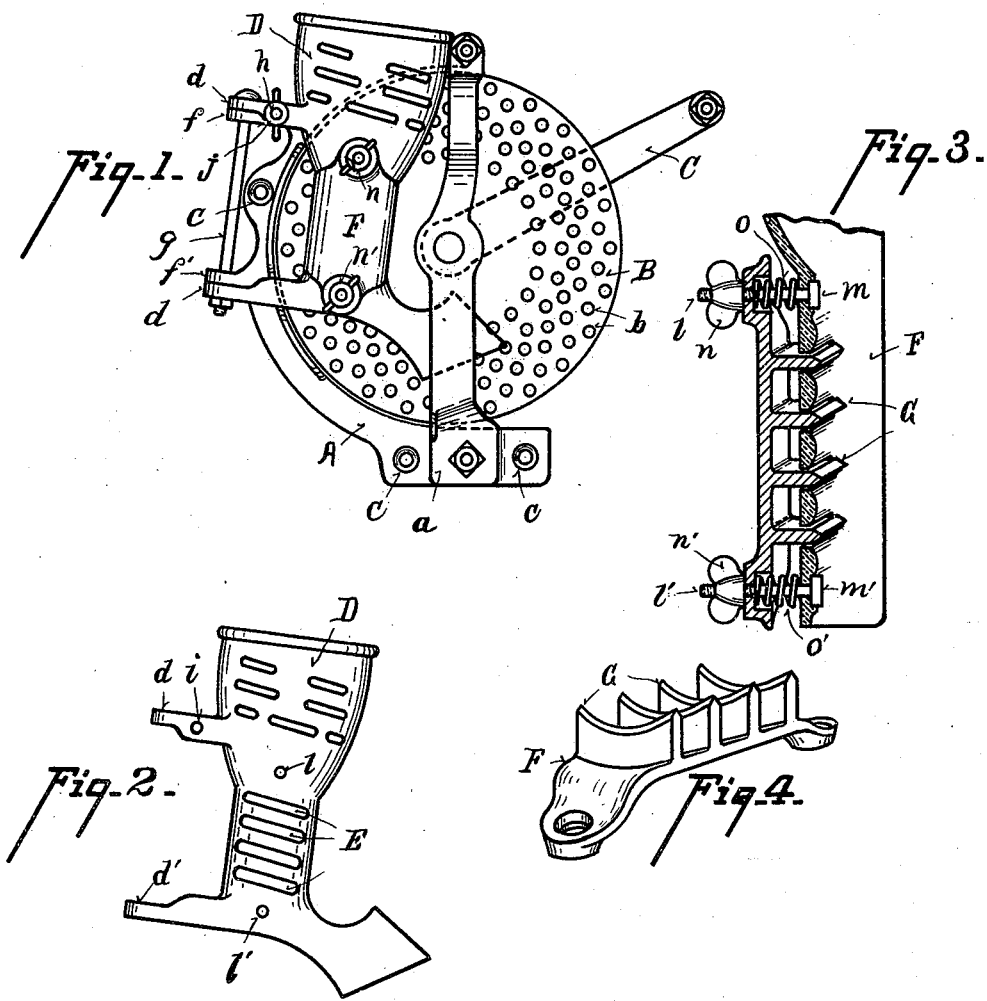
Witnesses  
C. W. Miles  
Oliver B. Kaiser
Inventor  
Jesse P. Outcalt  
by Wood, Boyd & Wood  
Attorneys

UNITED STATES PATENT OFFICE.

JESSE P. OUTCALT, OF LANCASTER, OHIO, ASSIGNOR TO THE EAGLE MACHINE COMPANY, OF SAME PLACE.

CORN-SHELLER.

SPECIFICATION forming part of Letters Patent No. 641,403, dated January 16, 1900.

Application filed November 2, 1899. Serial No. 735,572. (No model.)

*To all whom it may concern:*

Be it known that I, JESSE P. OUTCALT, residing at Lancaster, in the county of Fairfield and State of Ohio, have invented certain new and useful Improvements in Corn-Shellers, of which the following is a specification.

My invention relates to an improvement in corn-shellers, the features of which will be more fully set forth in the description of the accompanying drawings, forming a part of this specification, in which—

Figure 1 is a side elevation of the device. Fig. 2 is a perspective view of the hopper. Fig. 3 is a section through the side of the hopper, showing my improvement in position. Fig. 4 is a perspective view of the throat-reducing device.

A represents the frame, having a journal-bracket $a$, in which is journaled a rotary disk B, provided with reducing-stubs $b$.

C represents a crank attached to the shaft of the disk for revolving it.

The lower portion of the frame has bolt-holes $c\,c$ for attaching the device to a post or other desired support. The upper portion of the frame comprises a section of the top rim of the hopper. The hopper proper, D, consists of a piece of cast metal hopper-shaped at the top and converging into a throat at the lower end. This piece has ears $d\,d$ at the rear edge, by means of which it is pivoted to ears $f\,f$ on the frame, being connected by pivot-bolt $g$. A stud $h$ is projected laterally from the frame, passing through an orifice $e$ in the ear extension on the hopper, having a nut $j$, and a coil-spring (similar to those shown in Fig. 3) is slipped over the stud and bears against the nut and against the hinged hopper portion, so that one side of the hopper yields or swings on its pivot-bolt against the tension of the spring, which allows the hopper-opening to automatically accommodate itself to the size of the ear of corn. The tension may be regulated by turning up the nut $j$.

The hopper is provided with elongated inclined slots E through the side of the throat.

F represents the contracting clamp member or rag-bar, carrying ribs G, having concave edges extended through slots E. It is attached to the side of the hopper by bolts $l\,l'$, passing through the side of the hopper and provided on the inside with heads $m\,m'$. The outer ends are screw-threaded and provided with thumb-nuts $n\,n'$. $o\,o'$ represent coil-springs wound around these bolts and bearing, respectively, against the clamp member F and the side of the hopper. The coil-springs $o\,o'$ hold the clamp member out against the adjustable thumb-nuts $n\,n'$, so that as the nuts are turned the diameter of the throat is determined. These rib projections being opposite the toothed disk B assist in shelling the corn. By reason of this convenient and accurate contractible and extensible throat in the hopper any kind of corn may be shelled. There are no detachable pieces, and the operation is thoroughly convenient and efficient.

Having described my invention, I claim—

1. In a corn-shelling device, the combination of a frame, a rotary studded disk journaled thereon, a hopper supported against the studded side of the disk, the throat of the hopper being provided with slots, a rag-bar adjustably secured against the hopper and provided with ribs extended through said slots, and a spring engaging the rag-bar and hopper and pressing the former member normally outward, substantially as specified.

2. In a corn-shelling device the combination of a frame, a rotary studded disk journaled thereon, a hopper supported against the studded side of the disk, the throat of the hopper being provided with slots, a rag-bar supported against the hopper and having ribs extending inwardly through said slots, means for regulating the position of the rag-bar relative to the hopper, and a spring interposed between said members and pressing them normally apart, substantially as specified.

3. In a corn-shelling device the combination of a frame, a rotary studded disk journaled thereon, a hopper supported against the studded side of the disk, the throat of the hopper being provided with slots, a rag-bar having ribs extended through said slots, one or more bolts supporting the rag-bar against the hopper having adjustable heads engaging the outside of the rag-bar and a spring wound around each bolt between said rag-bar and hopper, substantially as specified.

4. In a corn-shelling device the combination of a frame, a rotary studded disk journaled thereon, a hopper pivoted to said frame, a spring engaging said hopper and pressing it yieldingly against the studded side of the disk, the throat of said hopper having elongated slots, a rag-bar supported against said hopper, having ribs extended through said slots, means for regulating the depth of insertion of said ribs, and a spring interposed between said hopper and rag-bar and pressing them normally apart, substantially as specified.

In testimony whereof I have hereunto set my hand.

JESSE P. OUTCALT.

Witnesses:
C. D. HILBS,
C. B. WHILEY.